(12) United States Patent
Wastlhuber et al.

(10) Patent No.: US 7,131,056 B2
(45) Date of Patent: Oct. 31, 2006

(54) METHOD FOR CHECKING AN INTERFACE

(75) Inventors: Robert Wastlhuber, Garching (DE); Alfons Baumgartner, Grassau (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/503,564

(22) PCT Filed: Nov. 30, 2002

(86) PCT No.: PCT/EP02/13544
§ 371 (c)(1),
(2), (4) Date: Aug. 2, 2004

(87) PCT Pub. No.: WO03/065137
PCT Pub. Date: Aug. 7, 2003

(65) Prior Publication Data
US 2005/0081123 A1    Apr. 14, 2005

(30) Foreign Application Priority Data
Feb. 1, 2002    (DE) ................................ 102 04 172

(51) Int. Cl.
*G06F 11/00* (2006.01)
(52) U.S. Cl. .................................................... 714/799
(58) Field of Classification Search ................. 710/52, 710/100, 313
See application file for complete search history.

(56) References Cited

U.S. PATENT DOCUMENTS

| | | | | |
|---|---|---|---|---|
| 3,775,598 A | * | 11/1973 | Chao et al. | .................... 714/33 |
| 3,777,129 A | * | 12/1973 | Mehta | ............................ 716/4 |
| 3,810,577 A | * | 5/1974 | Drescher et al. | .............. 714/25 |
| 5,814,726 A | | 9/1998 | Mitter | |
| 5,862,405 A | | 1/1999 | Fukuda et al. | |
| 6,032,254 A | | 2/2000 | Kume | |
| 6,820,149 B1 | * | 11/2004 | Moy | .......................... 710/104 |

FOREIGN PATENT DOCUMENTS

| | | |
|---|---|---|
| CN | 1157961 | 8/1997 |
| CN | 1166652 | 12/1997 |
| CN | 1196808 | 10/1998 |
| DE | 41 07 007 | 9/1992 |
| DE | 43 42 052 | 7/1996 |
| EP | 0 352 683 | 1/1990 |
| EP | 0 421 471 | 4/1991 |
| EP | 0 852 356 | 7/1998 |
| GB | 2 284 691 | 6/1995 |

* cited by examiner

*Primary Examiner*—Guy Lamarre
*Assistant Examiner*—Sam Rizk
(74) *Attorney, Agent, or Firm*—Kenyon & Kenyon LLP

(57) ABSTRACT

A method for examining an interface to a plurality of peripheral units of a numeric control system includes, firstly, an initialization step in which an unequivocal identification character is written into an identification character register of each peripheral unit, the register functioning in response to an address bus. The identification character register is read out in an examination step and is compared with an expected value. If an identification character does not tally with the corresponding expected value, an error message is produced, and if all of the identification characters tally with the corresponding expected values, the addressing of all of the peripheral units by the address bus is deemed successful.

5 Claims, 1 Drawing Sheet

METHOD FOR CHECKING AN INTERFACE

FIELD OF THE INVENTION

The present invention relates to a method for checking the interface between a numerical control system and several peripheral units. Such interfaces are made up of an address bus and a data bus, via which the peripheral units are connected to the numerical control system. The peripheral units and registers included in them are able to be selected via the address bus. Data may then be written via the data bus into the selected register or read from the selected register of the respective peripheral unit.

BACKGROUND INFORMATION

The numerical control system of a machine tool must, on the one hand, read out numerous sensors (e.g., position measurement units) and, on the other hand be able to supply actuators (such as axial drives) with commands. If the sensors and actuators are addressed via a common interface, a large number of such peripheral units can become established. In this context, various registers may occur within one peripheral unit. Thus, the most various different data are offered by one position measuring unit, such as various voltage levels of the position sensors (e.g., for the phase-shifted scanning of a grating structure) or information on the type of the position sensor.

German Patent No. 43 42 052 describes a control computer which is connected to several peripheral units via an address bus. In order to be able to address the peripheral units, a device is described using which the peripheral units are able to be assigned an address, simply and free of error.

The problem may arise that, for safety-directed applications, which occur ever more frequently in the field of numerical control of machine tools, correct functioning of the interface between the numerical control system and the peripheral units must be assured. It may be important that the peripheral units should not be mixed up. If several peripheral units of the same construction are present, the reading out of a register having identifications specific to type of construction is not sufficient, because these identifications are the same for all peripheral units of the same construction. However, if a wrong peripheral unit is addressed, which is, however, of the same construction as the one that was actually intended, a position value is, for example, read out of a register which is not able to be at once recognized by the control as being nonsensical, since it does correspond to a position value, however, as it happens, of the wrong peripheral unit. Such a mistake may take place if the address bus of the interface between the numerical control system and the peripheral unit works faultily.

Thus, in the case of a defect of the interface between control and peripheral unit, even given error-free specification of the addresses in the peripheral units, according to German Patent No. 43 42 052, exchange mistakes may be made with respect to the peripheral units.

In safety-directed numerical control systems, it is also conventional to record critical parameters (such as position values) with the aid of sensors designed in duplicate, which are scanned via two separate interfaces. However, it may be very expensive to implement such interfaces in duplicate. It may be more favorable to secure the function of a single interface such that both sensors may be scanned without there being a danger of mixing up the two sensors.

It is an aspect of the present invention to provide a method with the use of which the interface between a numerical control system and its peripheral units may be checked in a simple manner.

SUMMARY

For checking the interface of a numerical control system to several peripheral units, it may be provided that, in an initialization step, unique identifications are written into an identification register of each peripheral unit addressed via the address bus. In a checking step, the identification registers of all peripheral units are read out. In this context, the value read out is compared to the unique identifications of each peripheral unit as the expected value. If all the values read agree with the expected values, it may be concluded that all peripheral units are being successfully addressed, otherwise an error message may be generated, to which an appropriate reaction may take place.

Upon regular repetition of this method, an error appearing in the interface between numerical control system and peripheral units may be detected and appropriately reacted to.

According to an example embodiment of the present invention, a method for checking an interface to a plurality of peripheral units of a numerical control system includes: an initialization step including writing unique identification data into an identification register of each peripheral unit addressed via an address bus; and a first checking step. The first checking step includes: reading identification data from the identification registers; comparing the identification data read in the reading step to expected values that correspond to the unique identification data written in the initialization step; generating an error message in response to non-agreement of identification data with a corresponding expected value; and detecting a successful addressing of all peripheral units via the address bus in response to agreement of all identification data with respective expected values.

According to an example embodiment of the present invention, a device for checking an interface to a plurality of peripheral units of a numerical control system includes: means for writing unique identification data into an identification register of each peripheral unit addressed via an address bus; means for reading identification data from the identification registers; means for comparing the identification data read by the reading means to expected values that correspond to the unique identification data written by the writing means; means for generating an error message in response to non-agreement of identification data with a corresponding expected value; and means for detecting a successful addressing of all peripheral units via the address bus in response to agreement of all identification data with respective expected values.

Further aspects of the present invention and details pertaining thereto are derived from the following description of an example embodiment with reference to the appended Figures.

DETAILED DESCRIPTION

Figure 1:
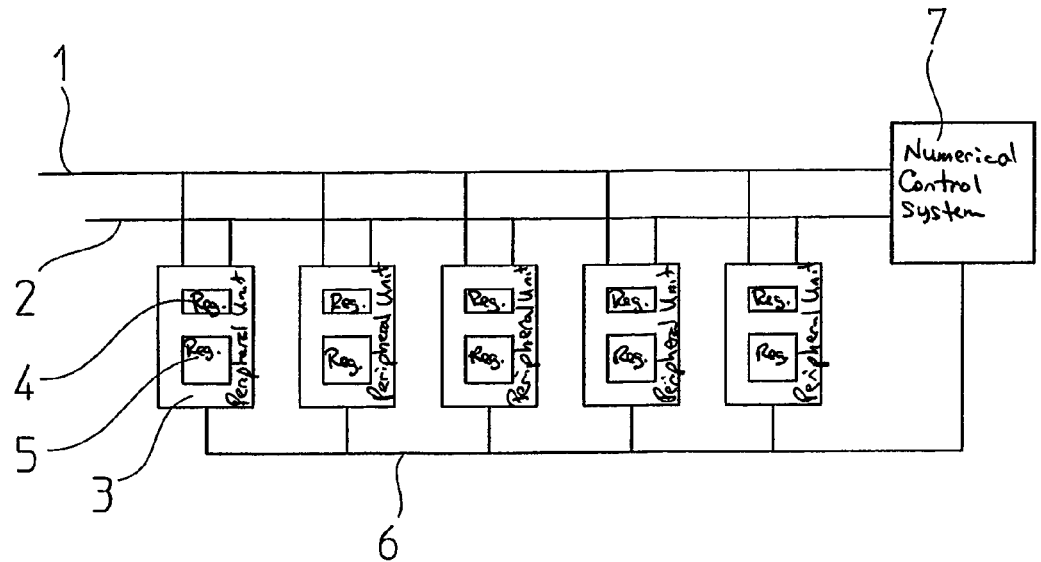
FIG. 1 illustrates the interface of a numerical control system with several peripheral units.

FIG. 1 shows a numerical control system 7 which is connected via an interface 1, 2 to several peripheral units 3. Inside each peripheral unit 3 there are several registers (memory locations) 4, 5. In each peripheral unit 3 there exists an identification register 4 and at least one additional register 5 in which various data may be stored, depending on the kind of the peripheral units 3.

Numerical control system 7, for instance, controls a machine tool on which the most varied sensors (e.g., position measuring devices) and actuators (axial drives, spindle drives) are mounted. These sensors and actuators correspond to peripheral units 3 shown in FIG. 1, which are connected via interface 1, 2 to numerical control system 7.

In this context, interface 1, 2 is made up of an address bus 1 and a data bus 2. Both address bus 1 and data bus 2 have a bit width which, in the case of address bus 1 limits the number of addressable registers 4, 5, or, in the case of data bus 2, the bit width of a transmitted data word. In addition to address bus 1 and data bus 2, control lines may be required which may determine, for instance, whether access to a register 4, 5 shall take place by reading or writing.

In addressing a certain register 4, 5, a part of the width of address bus 1 is used for addressing respective peripheral unit 3, and an additional part for addressing register 4, 5 within peripheral unit 3. Numerical control system 7 is able to notify peripheral units 3 via a signal line 6 whether the addressing via address bus 1 is inverted or not inverted. Thus, for example, the address "0101" in a non-inverted addressing is interpreted by peripheral units 3 exactly the same as the address "1010" in inverted addressing.

A possible error in address bus 1, which may absolutely be avoided or rapidly detected, is false addressing of each of the peripheral units 3. Because if, for example, on account of a short circuit to ground of a bit for addressing a peripheral unit 3, the wrong peripheral unit 3 is addressed, quite meaningful values may be written into the addressed register 4, 5 or read therefrom if, in the case of the wrongly addressed peripheral unit 3 a peripheral unit 3 is involved that is identical to the peripheral unit 3 that was actually intended. Thus, for example, an axle drive may receive a command for a movement which was actually intended for another axle of the machine tool, and thus uncontrolled movements may be carried out.

Figure 2:
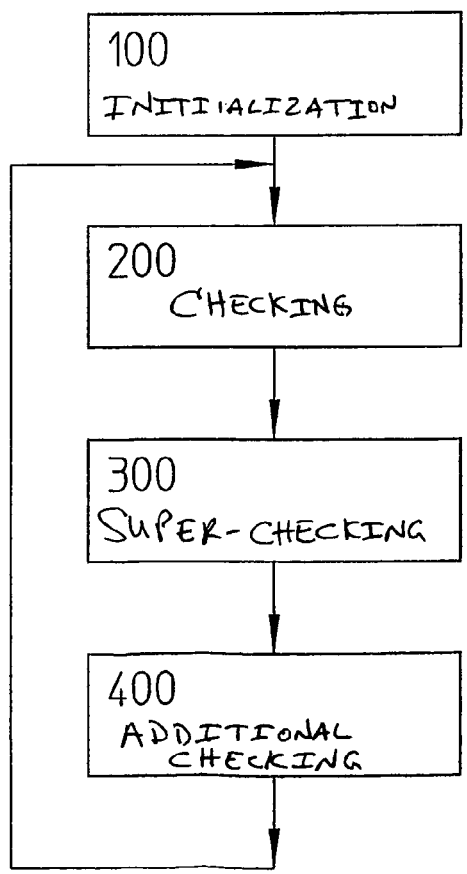
FIG. 2 illustrates a method for checking the interface between the numerical control system and the peripheral units.

With reference to FIG. 2, a method is explained using which such mixups of peripheral units 3 are avoided, or such errors in address bus 1 are rapidly detected.

In an initialization step 100, numerical control system 7 first addresses the identification register 4 of each peripheral unit 3 via address bus 1, and describes it via data bus 2 using a unique identification. This may be a number from a sequence for each peripheral unit 3.

In a checking step 200, identification register 4 of each peripheral unit 3 is read out by numerical control system 7, and the read-out identification is compared in each case to the expected value. In this context, the expected value is equal to the unique identification, written in step 100, of peripheral unit 3. If an identification that was read does not agree with the expected value, then an error has occurred. An error message is then generated and a reaction to it, in that, for instance, the machine tool is put into a safe condition. If all the values that are read agree with their respective expected values, correct addressing of all peripheral units 3 may be ensured.

In order to check further interface 1, 2 between numerical control system 7 and peripheral units 3, or, in an additional super-checking step 300, identification register 4 (or one of the several other registers 5, if they are available) may be used, one after another, to write several bit patterns and to read them again. Thus an 8-bit data bus 2 is able to be checked completely, by writing and reading back the four bit patterns:

|    | D0 | D1 | D2 | D3 | D4 | D5 | D6 | D7 |
|----|----|----|----|----|----|----|----|----|
| M1 | 0  | 1  | 0  | 1  | 0  | 1  | 0  | 1  |
| M2 | 0  | 0  | 1  | 1  | 0  | 0  | 1  | 1  |
| M3 | 0  | 0  | 0  | 0  | 1  | 1  | 1  | 1  |
| M4 | 1  | 0  | 0  | 0  | 0  | 0  | 0  | 0  | for short circuits or shunts. D0 to D7 here signify the eight data lines of data bus 2, and M1 to M4 signify the bit patterns. The sequence of the bit patterns does not matter in this context, as will be explained below. Similarly, a 16-bit data bus 2 is able to be checked completely, by writing and reading back the five bit patterns:

| D0 | | | | | | | ... | | | | | | | | D15 |
|----|---|---|---|---|---|---|---|---|---|---|---|---|---|---|---|
| M1 | 0 | 1 | 0 | 1 | 0 | 1 | 0 | 1 | 0 | 1 | 0 | 1 | 0 | 1 | 0 | 1 |
| M2 | 0 | 0 | 1 | 1 | 0 | 0 | 1 | 1 | 0 | 0 | 1 | 1 | 0 | 0 | 1 | 1 |
| M3 | 0 | 0 | 0 | 0 | 1 | 1 | 1 | 1 | 0 | 0 | 0 | 0 | 1 | 1 | 1 | 1 |
| M4 | 0 | 0 | 0 | 0 | 0 | 0 | 0 | 0 | 1 | 1 | 1 | 1 | 1 | 1 | 1 | 1 |
| M5 | 1 | 0 | 0 | 0 | 0 | 0 | 0 | 0 | 0 | 0 | 0 | 0 | 0 | 0 | 0 | 0 | for short circuits and shunts, the sequence of the bit patterns once again being arbitrary.

In the light of 8-bit data bus 2, let us here briefly explain the principle by which bit patterns M1 to M4 are selected. In order to detect short circuits, i.e., the getting stuck of one of the lines of data bus 2 on logical "0" or logical "1", it is sufficient if each of data lines D0 to D7 was successfully tested at least once on logical "1" and at least once on logical "0". It is more trouble to test for shunts. It has to be tested whether each data line D0 to D7 is able to be switched independently of each of the other data lines D0 to D7. For a $2^N$-bit-wide data bus 2, this may be accomplished using N bit patterns, thus, in the example of the 8-bit-wide data bus 2 using three bit patterns M1 to M3. In this context, every possible bit sequence (0-0-0 , 1-0-0, 0-1-0, ... 1-1-1) has to appear if one regards the data lines D0 to D7 in each case separate for each bit pattern M1 to M3.

Since in these $2^N$ N-bit sequences two N-bit sequences (in the example, on D0 and on D7) are made up only of logical "0" and logical "1", an additional bit pattern M4 may be needed for switching the two data lines D0 and D7 to the respective inverse level. This is achieved in the above example of an 8-bit-wide data bus 2 in that M4 has a logical "1" on D0 and a logical "0" on D7. The logical levels of data lines D1 to D6 are arbitrary for M4 in this example, since they already had a logical "0" and a logical "1". The interruption of one of data lines D0 to D7 may also lead to a failure of the test, since all logical levels may no longer be set on this data line.

Thus, for the complete checking of a $2^N$-bit wide data bus 2, only N+1 bit patterns M1, M2, M3, M4 are required (for N≧2). Compared to the test of all possible bit patterns of a $2^N$-bit-wide data bus 2 (2 to the power of $2^N$, i.e., 256 for an 8-bit-wide data bus 2), this may yield a considerable time saving.

Step 400 describes a further possibility for checking interface 2. This additional checking step 400 includes inverting the type of addressing of address bus 1, as was described further above. The selection of the type of addressing, may, in this context, take place via signal line 6. After the inverting of the type of addressing, steps 200 and 300 may be repeated. Individual bits of address bus 1, which get stuck on one potential, are detected as such, even if they would never have to change potential at a fixed type of addressing (either not inverted or inverted).

Additional checking step 400 may be dovetailed with the two checking possibilities described before, in that, for testing address bus 1, the identification registers 4 are written (step 100) using non-inverted addressing, and read (step 200) using inverted addressing.

In the test of data bus 2 with the aid of written and read-back bit patterns M1, M2, M3, M4 (step 300), the type of addressing may also be changed (inverted) as described, between reading and writing of bit patterns M1, M2, M3, M4. During the operation of numerical control system 7, steps 100, 200, 300, 400 described above may be repeated at regular intervals for checking interface 1, 2. The intervals of this checking, in this context, take a cue from the time the system of machine tool and numerical control system 7 may be safely operated, even using an erroneous interface 1, 2. In this context, it may be that repeating only a part of steps 100, 200, 300, 400 will suffice if, for instance, the unique identifications written in initialization step 100 will not be overwritten any more.

The sequence of steps 100 to 400, as was already described, is not fixed to the order shown in FIG. 2. Thus, step 400 may be dovetailed with steps 100, 200, 300. Step 300 may also be carried out before step 200. Additional changes in the order are also possible.

The steps for checking interface 1, 2 may not be executed successfully without functioning control lines, so that their functions may also be tested using the method described.

What is claimed is:

1. A method for checking an interface to a plurality of peripheral units of a numerical control system, comprising:
    an initialization step including writing, with non-inverted addressing, unique identification data into an identification register of each peripheral unit addressed via an address bus; and
    a first checking step including:
        reading identification data from the identification registers, with inverted addressing;
        comparing the identification data read in the reading step to expected values that correspond to the unique identification data written in the initialization step; and
        one of (a) generating an error message in response to non-agreement of identification data with a corresponding expected value and (b) detecting a successful addressing of all peripheral units via the address bus in response to agreement of all identification data with respective expected values.

2. The method according to claim 1, further comprising a second checking step including:
    successively writing, with non-inverted addressing, a plurality of bit patterns into each peripheral unit;
    reading, with inverted addressing, the bit patterns; and
    excluding short circuits, shunts and interruptions of a data bus of the interface in response to successfully reading the bit patterns.

3. The method according to claim 2, wherein the data bus has a width of $2^N$ bits, the plurality of bit patterns including N+1 bit patterns.

4. The method according to claim 1, further comprising repeating at least one of (a) the initialization step and (b) the first checking step after a predetermined time span.

5. A device for checking an interface to a plurality of peripheral units of a numerical control system, comprising:
    means for writing, with non-inverted addressing, unique identification data into an identification register of each peripheral unit addressed via an address bus;
    means for reading, with inverted addressing identification data from the identification registers;
    means for comparing the identification data read by the reading means to expected values that correspond to the unique identification data written by the writing means; and
    means for one of (a) generating an error message in response to non-agreement of identification data with a corresponding expected value and (b) detecting a successful addressing of all peripheral units via the address bus in response to agreement of all identification data with respective expected values.

* * * * *